Aug. 21, 1945.  A. J. WILLIAMS  2,383,280
SYRINGE
Filed Nov. 8, 1943
Fig. 1.
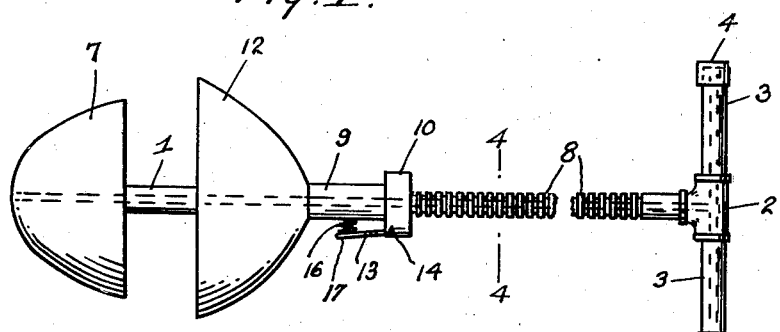
Fig. 2.
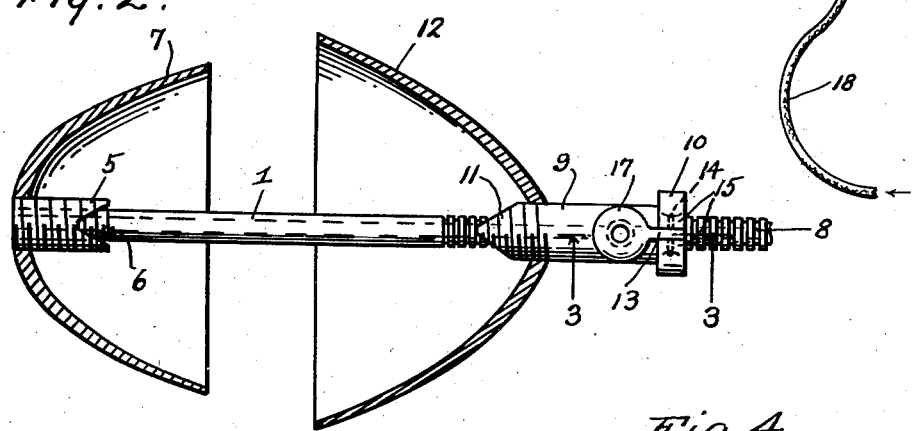
Fig. 3.
Fig. 4.
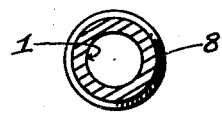
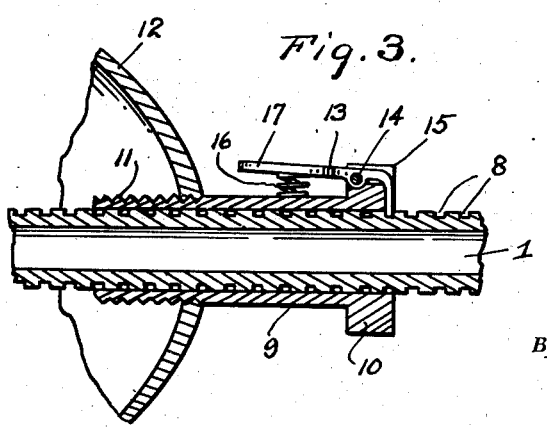
Inventor
ALONZO J. WILLIAMS
By Clarence A. O'Brien
and Harvey B. Jacobson
Attorneys Patented Aug. 21, 1945

2,383,280

UNITED STATES PATENT OFFICE 2,383,280

SYRINGE

Alonzo J. Williams, McLoud, Okla.

Application November 8, 1943, Serial No. 509,483

1 Claim. (Cl. 128—239)

My invention relates to syringes of the type forming the subject matter of my U. S. Letters Patent No. 1,969,831, dated August 14, 1934, and No. 2,065,779, dated December 29, 1936, and over which the instant invention is designed as an improvement.

The primary object of the instant invention is to provide a syringe for giving enemas, and the like, to animals, more particularly, and which combines maximum lightness in weight with strength and durability, is adapted for manufacture at a very low cost, and is equipped with serviceable and easily operated ratchet features.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in side elevation of my improved syringe in its preferred embodiment, Figure 2 is a fragmentary view in longitudinal section drawn to an enlarged scale, Figure 3 is a similar view drawn to a further enlarged scale and taken on the line 3—3 of Figure 2, and Figure 4 is a view in transverse section taken on the line 4—4 of Figure 1 and drawn to an enlarged scale.

Referring to the drawing by numerals, my improved syringe comprises a tubular stem 1 provided at its rear end with a T fitting 2 in the opposite ends of which are suitably secured a pair of oppositely extending hand grip tubes 3 capped, as at 4, at their outer ends and forming a hollow handle on said stem.

A short nipple 5 is threaded onto the front end of the stem 1, as at 6, and threaded onto the outer end of said nipple 5 is a rearwardly opening and flaring shell forming a hollow, forwardly tapering and rounded head 7.

The stem 1, forwardly of the fitting 2, is provided with circular ratchet teeth 8 extending toward the front end of the stem 1 for a suitable distance.

A short sleeve 9 is slidably fitted on the stem 1 for adjustment over the ratchet teeth 8 and is provided with a circular head 10 at its rear end, and an externally threaded front end 11.

A forwardly opening and flaring shell, larger than the head 7, is threaded onto the end 11 of the sleeve 9 to form a hollow clamp 12.

A right angled dog 13 is pivoted intermediate its ends, as at 14, in a right angled slot 15 in the head 10 so that one end of said dog engages the ratchet teeth 8. A coil spring 16 interposed between the other end of said dog 13 and the sleeve 9 maintains the dog engaged with said ratchet teeth 8, said other end of the dog being disc-like, as at 17, to provide a finger piece for releasing said dog. As will be clear, the dog 13 is designed to ratchet forwardly over the ratchet teeth 8 and dog movement of the sleeve 9 and clamp 12 rearwardly of the stem 1. A fluid inlet line 18 may be suitably extended through one cap 4 into the hollow handle described.

In the use of the syringe, the head 7 is inserted into the rectum of the animal, the dog 13, sleeve 9 and clamp 12 move forwardly along the stem 1 to clampingly engage the outer end of the rectum, the dog 13 ratcheting over the teeth 8 and locking to the same when the clamp 12 is properly set so that said clamp cannot back off. To release the clamp 12, it is merely necessary to release the dog 13. The sleeve 9 and clamp 12 are rotatable on the stem 1, as will be clear, to facilitate setting the clamp. It is to be noted that the head 7 and clamp 12 are interchangeable, for instance, if it should be desired to use the clamp 12 reversed and as a larger head.

When the clamp 12 is thus used as a larger head, a relatively larger replacement clamp, not shown, may be provided to complement the head formed by the reversed interchanged clamp 12. Also, the head 7 may be reversed and used as a smaller clamp and replaced by a smaller size head, not shown, complementing the thus interchanged head 7. Thus the head 7 and clamp 12 may be interchanged to accommodate openings of different sizes.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A syringe of the class described comprising a tubular stem for passing liquid therethrough and provided with a rear end hollow handle adapted for connection to a liquid pressure line, a shell-like head mounted on the front end of said stem, said head having a rounded front end and flaring rearwardly, a clamping shell similar to and larger than said head and flaring forwardly, and means to mount said clamping shell on said stem for sliding movement along the stem toward said head into different set positions comprising circular ratched teeth on said stem, a sleeve endwise slidable and rotatable on said stem over said teeth said clamping shell being threaded on said sleeve, and a dog on said sleeve ratcheting forwardly over said teeth and coacting with said teeth to dog rearward movement of said sleeve, the mounting for said head comprising a sleeve on the front end of said stem and upon which said head is threaded, the last-mentioned sleeve being adjustable along the stem to adjust said head and of the same diameter as the sleeve first mentioned whereby said head and shell are interchangeable.

ALONZO J. WILLIAMS.